United States Patent [19]

Takatani et al.

[11] Patent Number: 4,852,897

[45] Date of Patent: Aug. 1, 1989

[54] LAYOUT OF STEERING MECHANISM FOR FOUR-WHEEL STEERING VEHICLE

[75] Inventors: Teruhiko Takatani, Kure; Muneharu Yamada; Tomomi Miyamoto, both of Hiroshima, all of Japan

[73] Assignee: Mazda Motor Corporation, Hiroshima, Japan

[21] Appl. No.: 186,483

[22] Filed: Apr. 26, 1988

[30] Foreign Application Priority Data

Apr. 28, 1987 [JP] Japan .................... 62-105414

[51] Int. Cl.⁴ .................... B62D 5/10; B62D 7/14
[52] U.S. Cl. .................... 280/91; 180/140
[58] Field of Search ............... 180/140, 233, 247, 248, 180/232; 280/91, 99, 100, 101, 102, 103, 781; 296/204, 192

[56] References Cited

U.S. PATENT DOCUMENTS

| | | | |
|---|---|---|---|
| 2,371,022 | 3/1945 | Blagden | 280/91 X |
| 2,963,106 | 12/1960 | Sampietro | 296/204 X |
| 4,467,885 | 8/1984 | Furukawa et al. | 180/140 |
| 4,610,328 | 9/1986 | Kanazawa et al. | 280/91 X |

FOREIGN PATENT DOCUMENTS

| | | |
|---|---|---|
| 58-214463 | 6/1957 | Japan . |
| 2124167 | 6/1982 | United Kingdom . |

Primary Examiner—Mitchell J. Hill
Attorney, Agent, or Firm—Fleit, Jacobson, Cohn, Price, Holman & Stern

[57] ABSTRACT

A four-wheel steering mechanism comprising a front steering disposed outside of a passenger compartment for steering front wheels in accordance with a steering wheel, rear steering mechanism disposed outside of the passenger compartment for steering rear wheels in accordance with the steering amount of the front wheels, and connecting members connected with both the front and rear steering mechanisms and extended longitudinally for transmitting the steering in the front wheels to the rear steering mechanism characterized by the connecting member being provided in the passenger compartment. The steering mechanism can be protected from rusting.

20 Claims, 4 Drawing Sheets

LAYOUT OF STEERING MECHANISM FOR FOUR-WHEEL STEERING VEHICLE

BACKGROUND OF THE INVENTION

1. Field of the Invention

The present invention relates to a four-wheel steering system, specifically to a connecting mechanism for connecting a front wheel steering mechanism and a rear wheel steering mechanism.

2. Description of the Prior Art

In the field of motor vehicles, there is disclosed a steering system for steering rear wheels as well as front wheels in Japanese Patent Public Disclosure No. 58-214463. The disclosed steering system is constituted by a front steering mechanism for steering front wheels in accordance with an operation of a steering wheel, a rear steering mechanism for steering rear wheels in accordance with the steering of the front wheels and a connecting mechanism connected with both the front steering mechanism and the rear steering mechanism for transmitting the steering for the front wheels to the rear steering mechanism wherein the connecting mechanism is disposed under the vehicle body, that is, outside of a passenger compartment.

It should be noted however that in the case where the connecting mechanism is positioned outside of the passenger compartment, the connecting mechanism would get wet or muddy water during rainy weather. As a result, the connecting mechanism would rust and thereby affect proper operation due to a reduction of its strength and rigidity. When the vehicle runs during snow condition, there is a possibility of ice-forming on the connecting mechanism. In view of the above phenomenon, the connecting mechanism should be manufactured to have a margin for the rust. Alternatively in order to prevent the rain water and snow from applying to the connecting mechanism, it is necessary to provide a particular means for protecting the a connecting mechanism, for instance to cover the mechanism with a predetermined coating material.

SUMMARY OF THE INVENTION

It is therefore an object of the present invention is to provide a four-wheel steering mechanism of a reliable operation.

It is another object of the present invention to dispose a connecting mechanism appropriately for connecting a front and rear steering mechanism so as to provide a reliable operation of the four-wheel steering mechanism.

It is further object of the present invention to provide the connecting mechanism with an appropriate protection without a particular complicated protecting means.

The above and other objects can be accomplished by the following four-wheel steering mechanism comprising a front steering mechanism disposed outside of a passenger compartment for steering front wheels in accordance with an operation of a steering wheel, rear steering mechanism disposed outside of the passenger compartment for steering rear wheels in accordance with the steering amount of the front wheels, and connecting means connected with both the front and rear steering mechanisms and extended longitudinally for transmitting the movement of the front steering mechanism to the rear steering mechanism characterized by at least a part of the connecting means being provided in the passenger compartment, there being formed a first and second openings on wall means constituting the passenger compartment, and the connecting means being extended into the passenger compartment through the first opening and outside of the passenger compartment through the second opening.

According to the present invention, there is no need to provide a particular means for protecting the connecting means between the front and rear steering mechanisms to keep the connecting means away from rain water and snow. As a result, the connecting means is prevented from forming any rust thereon. This means that the connecting means is not necessary to have a margin for rust to thereby reduce a manufacturing cost and weight of the vehicle.

The above and other objects and features of the present invention will be apparent from the following description by taking reference with accompanying drawings employed for a preferred embodiment of the present invention.

DETAILED DESCRIPTION OF PREFERRED EMBODIMENTS

Figure 1:
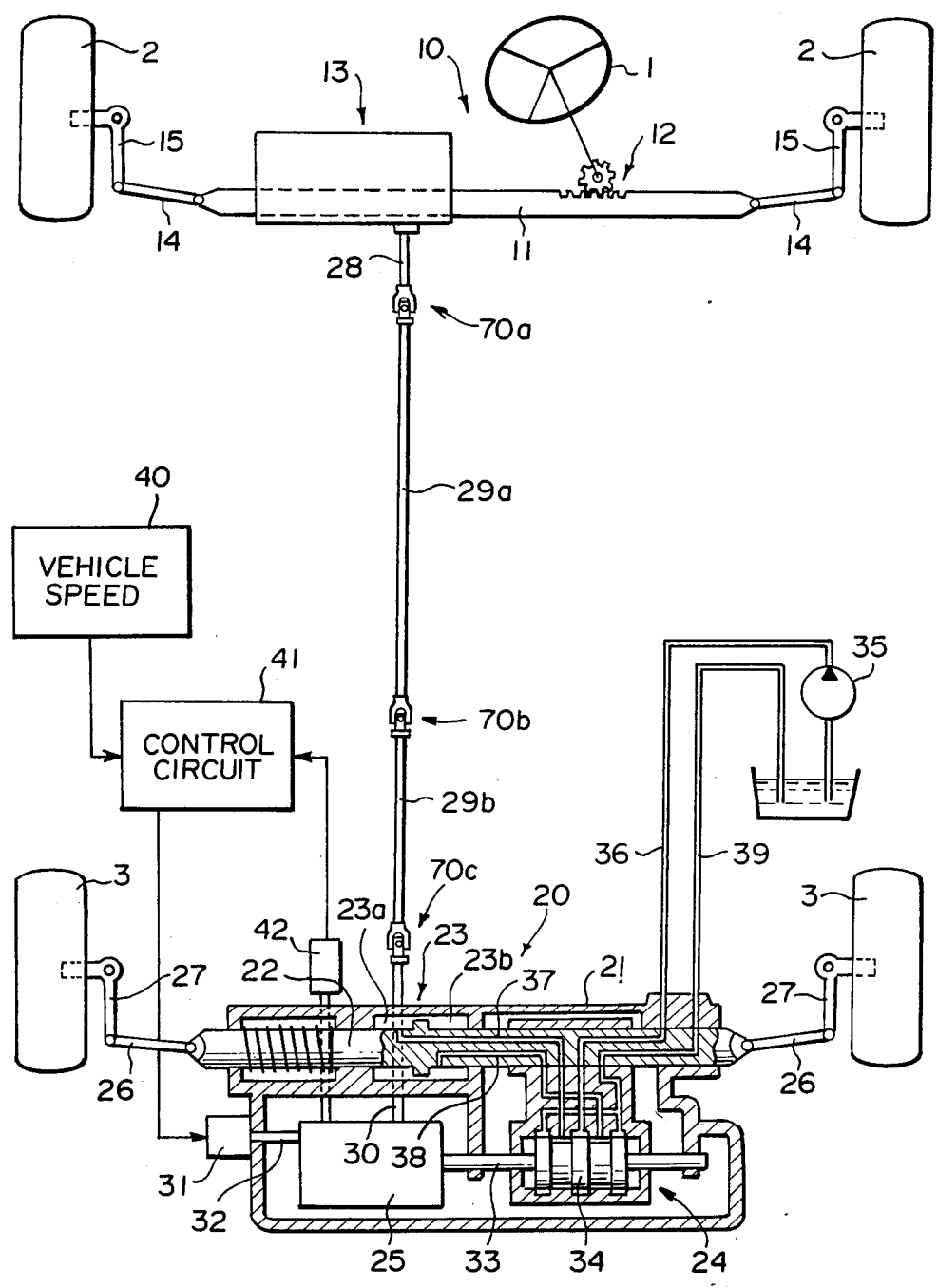
FIG. 1 is a schematic view of a four-wheel steering mechanism in accordance with the present invention.

Referring to FIG. 1, there is shown a four-wheel steering system having a front steering mechanism 10 for steering a right and left front wheels 2,2 based on a steering of a steering wheel 1, and a rear steering mechanism 20 for steering a right and left rear wheels 3,3 in accordance with the steering amount of the front wheels 2,2.

The front steering mechanism 10 is provided with a front wheel steering rod 11 extending laterally, a rack and pinion mechanism 12 for moving the steering rod 11 in the lateral direction of a vehicle and an output section 13 for transmitting the movement of the rod 11, that is, the steering of the front wheels 2,2 to the rear steering mechanism 20. The steering rods 11 is connected with the front wheels 2,2 at the opposite ends through tie rods 14, 14 and knuckle arms 15,15.

The rear steering mechanism 20 is provided with a rear wheel steering rod 22 disposed in a housing 21, a power cylinder 23 disposed in the housing 21 for actuating the rod 22 in the lateral direction of the vehicle, a control valve 24 for controlling a hydraulic pressure applied to the power cylinder 23 and a steering control mechanism 25 for controlling the operation of the valve 24. The steering rod 22 is connected with the rear wheels 3,3 at the opposite ends through tie rods 26, 26 and knuckle arms 27,27.

The steering control mechanism 25 is provide with a first and second input shafts 30 and 32, and an output shaft 33. The first input shaft 30 is adapted to be rotated resulting from the movement of the steering rod 11 of the front steering mechanism 10 through an output shaft 28 of the rear steering output section 13 and a first and second connecting members 29a and 29b which are connected to the output shaft 28. The second input shaft 32 is adapted to be rotated by a step motor 31. The output shaft 33 is adapted to move in the axial direction thereof in accordance with the rotation amount of the first and second input shaft 30,32. To the output shaft 33 is connected a valve body 34 of the control valve 24.

To the control valve 24 are connected a hydraulic supply line 36 communicated with an oil pump 35, a first and second hydraulic lines 37,38 communicated with a left and right chambers 23a and 23b of the power cylinder 23 respectively, and a drain line 39. In FIG. 1, when the valve body 34 is moved to the right from the neutral position as illustrated, the supply line 36 is communicated with the left chamber 23a of the power cylinder 23 through the first hydraulic line 37 and at the same time, the right chamber 23b is communicated with the drain line 39 so that the power cylinder 23 produces a force which causes the rear steering rod 22 to move to the right. To the contrary, when the valve body 34 is moved to the left, the hydraulic supply line 36 is communicated through the second hydraulic line 38 with the right chamber 23b of the power cylinder 23 and the left chamber 23a is communicated with the drain line 39 so that the power cylinder produces a power for moving the rod 22 to the left. As a result, the rear wheels 3,3 can be steered through the movement of the rear wheel steering rod 22 as aforementioned.

The step motor 31 is adapted to be controlled by a control circuit 41 to which a signal from a vehicle speed sensor for detecting vehicle speed is applied. Therefore, the control mechanism 25 is controlled based on the vehicle speed introduced by the step motor 31 through the second input shaft 32 and the steering amount of the front wheels 2,2. The valve body 34 of the control valve 24 is moved resulting from the operation of the control mechanism 25 so that the rear wheels 3,3 can be steered in accordance with the steering amount and direction of the front wheels 2,2 and the vehicle speed. The control mechanism 25 is provided with a steering ratio sensor 42 for detecting a steering ratio of the steering amount of the rear wheels 2,2 to that of the front wheels 3,3 so that a feedback control for the steering amount of the rear wheels 3,3 is accomplished based on a signal from the sensor 42.

Figure 2:
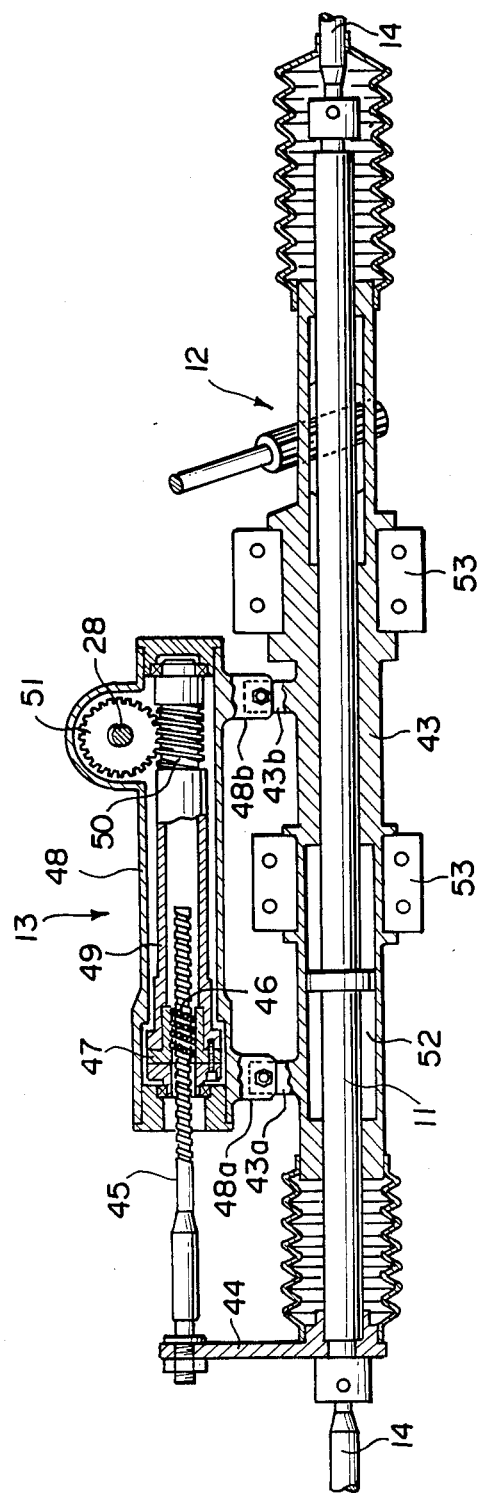
FIG. 2 is a sectional view of a front steering mechanism.
Figure 3:
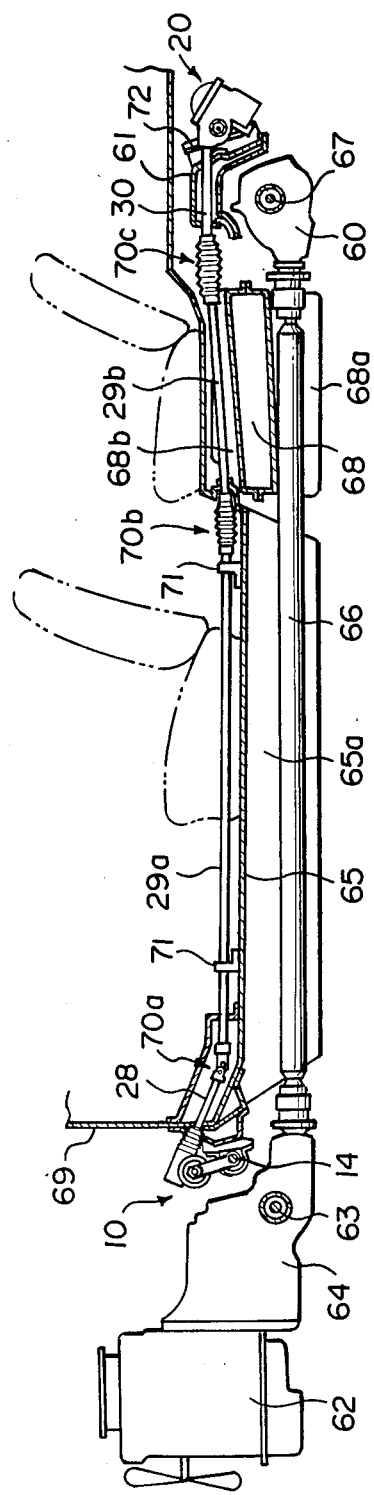
FIG. 3 is a partially sectional view showing a structure of a front and rear steering mechanisms and connecting mechanism.

The output section 13, as shown in FIG. 2, is constituted by a ball-threaded shaft 45, a ball-nut 47 which receives the the shaft 45 at a predetermined position and is engaged with a plurality of balls 46 provided helically around the shaft 45, a driving shaft 49 integrated with the ball-nut 47 and rotatably mounted in a housing 48 with a limitation of the movement of the axial direction thereof, a worm gear 50 formed on the driving shaft 49 at the tip end portion thereof, and the output shaft 28 to which a worm wheel is fixed at the end portion of the shaft 28. The ball-threaded shaft 45 is supported by a bracket 44 which is formed at one end of the rod 11 in a housing 43 so as to extend in parallel with the rod 11. The housings 43, and 48 are connected with each other by connecting portions 43a, 48a and 43b, 48b.

According the above structure, when the steering wheel 1 is operated, the steering rod 11 and the ball-threaded shaft 45 are moved in a predetermined direction by a predetermined amount through the rack and pinion mechanism 12 so that the worm gear 50 and worm wheel 51 are rotated in a predetermined direction by a predetermined amount resulting in a rotation of the output shaft 28. The rotation of the output shaft 28 is transmitted to the first input shaft 30 through the first and second connecting members 29a, 29b.

In the housing 43, there is provided a power cylinder 52 for assisting the movement of the front steering rod 11 caused by the rack and pinion mechanism 12. The housings 43 and 48 are mounted on a predetermined front and lower portion of a vehicle body through mounting members 53,53 around the housing 43.

In next, There is a description about the connecting members 29a and 29b for connecting the front and rear steering mechanism 10 and 20.

An illustrated vehicle is of a four-wheel drive which comprises a rear wheel differential mechanism 60 carried by a cross member 61 disposed at a rear portion of the vehicle body and extending transversely. The differential mechanism 60 is carried at the intermediate and lower position of the cross member 61 through a mounting member(not shown). In the front side of the vehicle, there are provided an engine 62, a front wheel drive shaft 63 integrated with the engine 62 for driving the front wheels 2,2 and a transfer device 64 which receives an output for driving the rear differential mechanism 60.

The differential mechanism 60 and the transfer device 64 is connected with each other through a propeller shaft 66 which is disposed in a tunnel portion 65a formed on a floor a single plate of panel 65. The tunnel portion 65a is formed at the intermediate portion of the floor panel 65 and extends in the longitudinal direction of the vehicle. The floor panel 65 constitutes a lower portion of the vehicle body. It will be understood that the front wheels 2,2 are driven by the output of the engine 62 through the front driving shaft 63 and the output of the engine 62 is transmitted to the differential mechanism 60 and shared in the mechanism 60 to be transmitted the rear wheels 3,3 respectively through the rear driving force 67.

There is provided a fuel tank 68 in front of the cross member 61. The fuel tank 68 is formed at the bottom portion with a recess 68a in which the propeller shaft 66 is disposed.

In the illustrated embodiment, the output shaft 28 of the output section 13 in the front steering mechanism 10 is disposed within a cabin passing through the dash panel 69. The first connecting member 29a which is connected to the output shaft 28 through the universal joint 70a is disposed within the cabin and secured to the floor panel 65 through brackets 71. In addition, the second connecting member 29b which is connected to the first connecting member 29a through a universal joint 70b passes through a recess 68b formed on the upper portion of the tank 68. The second connecting member 29b is connected through a universal joint 70c to the first input member 30 of the rear steering mechanism which is mounted at the rear and intermediate portion of the cross member 61 through a mounting member 72 so that the rear steering mechanism is actuated to steer the rear wheels 3,3 in a predetermined direction by a predetermined amount.

According to the above structure of the steering system, the rear steering output shaft 13 and the first connecting member 29a connected to the shaft through the universal joint 70a are disposed in the cabin so as to be kept away from the rain water and muddy water in a rainy weather drive thereby restricting a rust produced thereon. As a result, the shaft 13 and the connecting member 29a can be prevented from a reduction in the strength and rigidity. In addition, in a snowy load drive, it is unlikely that the shaft 28 and the first connecting member 29a are covered with an ice. Therefore, they can maintain their appropriate operation. As a result, the shaft 28 and connecting member 29a can be manufactured to have a diameter as small as possible to reduce the weight and cost of the system.

The second connecting member 29b and the first output shaft 30 connected to the connecting member 29b are protected by the fuel tank 68 and the rear differential mechanism 60 which are located under the shaft 30 and the member 29b so as to obtain the same result as the shaft 28 and the member 29a.

Further, according to the above structure, the shaft 28 and the first connecting member 29a do not interfere with the propeller shaft 66 which is disposed under the floor panel 65 and extends longitudinally in the four-wheel drive vehicle as illustrated in the present embodiment.

In the illustrated embodiment, the rear steering mechanism 20 is positioned rearward the rear differential mechanism 60 and the cross member 61 so that the steering system 20 can be protected by the differential mechanism 60 and the cross member 61. For instance, the mechanism can be prevented from hitting a road surface or having flying stone striking the mechanism.

Figure 4:
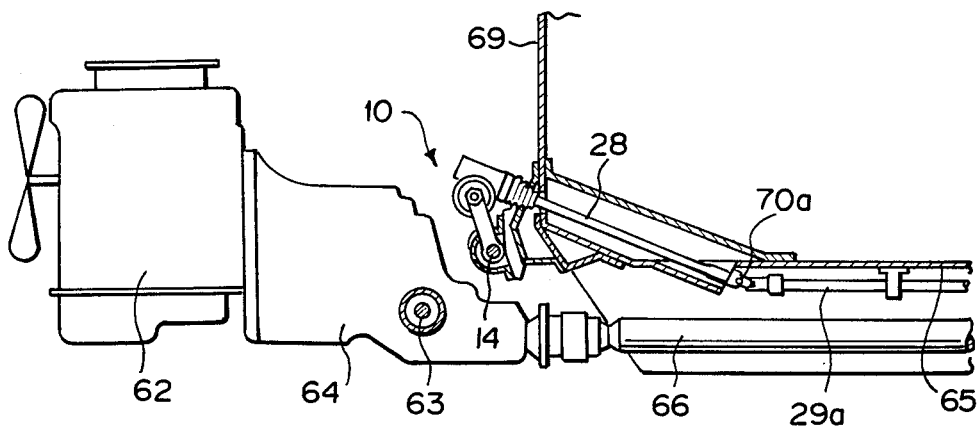
FIG. 4 is a sectional view similar to the FIG. 3 but another embodiment of the present invention.

Referring to FIG. 4, there is shown another embodiment of a steering mechanism in accordance with the present invention.

In the illustrated embodiment, the output shaft 28 of the front steering mechanism 10 is disposed within the cabin but the universal joint 70a connected to the shaft 28 and the first connecting member 29a are disposed in the tunnel portion 65a formed by the floor panel 65.

According to this structure, the front steering mechanism 10 does not interfere with the engine 62 and the transfer device 64 and the connecting members 29a and 29b and other components can be protected by the propeller shaft 66, the differential mechanism 60 and the cross member 61 as well as the first embodiment.

We claim:

1. A four-wheel steering mechanism comprising a front steering mechanism disposed outside of a passenger compartment for steering front wheels in accordance with an operation of a steering wheel, a rear steering mechanism disposed outside of the passenger compartment for steering rear wheels in accordance with the steering amount of the front wheels, and connecting means connected with both the front and rear steering mechanisms and extending longitudinally for transmitting the movement of the front steering mechanism to the rear steering mechanism, a part of the connecting means being provided in the passenger compartment, a first opening and a second opening formed in walls constituting the passenger compartment, and the connecting means extending into the passenger compartment through the first opening and extending out of the passenger compartment through the second opening.

2. A four-wheel steering mechanism in accordance with claim 1 in which the front steering mechanism is positioned in an engine compartment defined forward of a dash panel which constitutes a front wall of the passenger compartment.

3. A four-wheel steering mechanism in accordance with claim 2 in which the front steering mechanism is mounted on the lower portion of the dash panel.

4. A four-wheel steering mechanism in accordance with claim 2 characterized by the connecting means passing through the dash panel and extending over a floor panel of the passenger compartment longitudinally and rearwardly therefrom.

5. A four-wheel steering mechanism in accordance with claim 4 in which the floor panel is formed to have an upright portion extending upwardly under a seat cushion of a rear seat, the connecting means passing through the upright portion and extending outward the passenger compartment.

6. A four-wheel steering mechanism in accordance with claim 5 characterized by the connecting means being disposed over a fuel tank which is located at a rear and lower portion of a vehicle body.

7. A four-wheel steering mechanism in accordance with claim 6 in which the fuel tank is formed with at the upper portion a recess extending in the longitudinal direction of the vehicle, the connecting means being received in the recess.

8. A four-wheel steering mechanism in accordance with claim 2 in which the front steering mechanism is provided with a rack and pinion mechanism having a pinion which is adapted to be steered in accordance with a steering operation of the steering wheel and a rack for transmitting a rotation of the pinion to the front wheels through respective tie rods and a converting mechanism for converting the reciprocal movement of the rack in the lateral direction of the vehicle to a rotative movement of the connecting means, the converting mechanism being positioned over the rack and pinion mechanism.

9. A four-wheel steering mechanism in accordance with claim 2, in which a propeller shaft is provided under a single plate structure of a floor panel and extends longitudinally for transmitting a driving force from the engine, disposed in the engine compartment defined forward of the dash panel, to the rear wheels.

10. A four-wheel steering mechanism in accordance with claim 9 in which the propeller shaft passes through a tunnel portion formed by the floor panel, the connecting means extending longitudinally in the passenger compartment over the tunnel portion.

11. A four-wheel steering mechanism in accordance with claim 10 in which the floor panel is formed to have an upright portion extending upwardly under a seat cushion of a rear seat, the connecting means passing through the upright portion and extending outward the passenger compartment.

12. A four-wheel steering mechanism in accordance with claim 11 in which the rear steering mechanism is disposed over a differential mechanism which is adapted to transmit a rotation force to the rear wheels, and the differential mechanism extending outward from the passenger compartment.

13. A four-wheel steering mechanism in accordance with claim 12 in which the rear steering mechanism is disposed rearward the differential mechanism.

14. A four-wheel steering mechanism in accordance with claim 10 being used in combination with a four-wheel drive vehicle.

15. A four-wheel steering mechanism in accordance with claim 12 characterized by the connecting means being disposed over a fuel tank which is located at a rear and lower portion of a vehicle body.

16. A four-wheel steering mechanism in accordance with claim 15 being used in combination with a four-wheel drive vehicle.

17. A four-wheel steering mechanism in accordance with claim 1, in which the connecting means transmits a steering movement of the front steering mechanism to the rear wheel steering mechanism as rotative movement of the connecting means.

18. A four-wheel steering mechanism comprising a front steering mechanism disposed outside of a passenger compartment for steering front wheels in accordance with an operation of a steering wheel, a rear steering mechanism disposed outside of the passenger compartment for steering rear wheels in accordance with the steering amount of the front wheels, and connecting means connected with both the front and rear steering mechanisms and extending longitudinally for transmitting the movement of the front steering mechanism to the rear steering mechanism, a part of the connecting means being provided in the passenger compartment, a first opening and a second opening formed in walls constituting the passenger compartment, and the connecting means extending into the passenger compartment through the first opening and outside of the passenger compartment through the second opening, the front steering mechanism being positioned in an engine compartment defined forward of a dash panel which constitutes a front wall of the passenger compartment, a propeller shaft being provided under a floor panel and extending longitudinally for transmitting a driving force from the engine, disposed in the engine compartment defined forward the dash panel, to the rear wheels, the propeller shaft passing through a tunnel portion formed by the floor panel, the connecting means extending longitudinally in the passenger compartment over the tunnel portion, the floor panel being formed to have an upright portion extending upwardly under a seat cushion of a rear seat, the connecting means passing through the upright portion and extending outward from the passenger compartment, the rear steering mechanism being disposed over a differential mechanism which is adapted to transmit a rotation force to the rear wheels, and the differential mechanism extending outward from the passenger compartment.

19. A four-wheel steering mechanism in accordance with claim 18, in which the rear steering mechanism is disposed rearward the differential mechanism.

20. A four-wheel steering mechanism in accordance with claim 18, wherein the connecting means is disposed over a fuel tank which is located at a rear and lower portion of a vehicle body.

* * * * *